United States Patent
Koizumi

[11] Patent Number: 5,355,730
[45] Date of Patent: Oct. 18, 1994

[54] APPARATUS FOR DRIFT CANCELLATION IN ANGULAR VELOCITY DETECTING SENSOR

[75] Inventor: Yoshio Koizumi, Kawasaki, Japan
[73] Assignee: Taya Engineering Co., Ltd., Yokohama, Japan
[21] Appl. No.: 29,409
[22] Filed: Mar. 10, 1993
[30] Foreign Application Priority Data
  Mar. 23, 1992 [JP] Japan .................................. 4-064496
[51] Int. Cl.⁵ ............................................. G01P 3/00
[52] U.S. Cl. .......................................... 73/497; 73/505; 73/1 D; 364/551.01
[58] Field of Search ............ 73/10, 505, 497, 187 H, 73/178 R; 364/551.01, 565, 571.01, 571.02, 571.03, 571.04, 571.05

[56] References Cited
U.S. PATENT DOCUMENTS

| | | | |
|---|---|---|---|
| 4,409,836 | 10/1983 | Comroe et al. | 73/505 |
| 4,470,124 | 9/1984 | Tagami et al. | 73/1 D |
| 5,115,238 | 5/1992 | Shimizu et al. | 73/178 R |

Primary Examiner—Hezron E. Williams
Assistant Examiner—Helen C. Kwok
Attorney, Agent, or Firm—Armstrong, Westerman, Hattori, McLeland & Naughton

[57] ABSTRACT

A drift canceling apparatus has an angular velocity detecting sensor with a detection output having temperature/time drift, the output being supplied to an object to be controlled. A reference signal extraction circuit extracts a reference signal from the detection output. The reference signal extraction circuit includes a differentiation circuit for differentiating the detection output of the angular velocity detecting sensor, a comparison circuit for comparing the detection output of the angular velocity detecting sensor with the output signal of the differentiation circuit to produce a comparison circuit output signal, a selection circuit for selecting only an output in a required normal operation region from the comparison circuit output signal, and a sample hold circuit for sample-holding the detection output of the angular velocity detecting sensor in response to the output of the selection circuit to produce a sample hold signal used as the reference signal. A control signal generation circuit is provided for generating a control signal from the output of the angular velocity detecting sensor on the basis of the reference signal.

3 Claims, 5 Drawing Sheets

APPARATUS FOR DRIFT CANCELLATION IN ANGULAR VELOCITY DETECTING SENSOR

BACKGROUND OF THE INVENTION

The present invention relates to a control system using an angular velocity detecting sensor with drift, and particularly relates to an apparatus for canceling drift in such an angular velocity detecting sensor so that occurrence of drift of the entire control system due to the drift of the angular velocity detecting sensor can be prevented.

In various sensors, generally, drift occurs in their outputs. Temperature drift due occurs to variations in temperature characteristics of elements constituting the sensors, and occur due to variations in environmental temperature and self heat generation; Time drift occurs which is drift appearing in sensor outputs with the passage of operation time.

In the case where a control system is constituted by using an angular velocity detecting sensor with such drift, conventionally, the influence of drift of the angular velocity detecting sensor on the whole of the control system is suppressed by making the output of the sensor pass through an AC coupler or the like to nullify the control gain in a DC zone of a control band to thereby suppress the control gain in the time region of drift.

The above measure to cope with such drift as mentioned above is conventionally well known.

In such an above measure in which the output of an angular velocity detecting sensor is taken out through an AC coupler so as to reduce the influence of drift, however, the gain in a DC zone of the control band falls and it is therefore impossible to apply this measure to an object to be controlled which requires control to be carried out also in the DC zone. In such an above measure, therefore, there is a problem that the field of application of angular velocity detecting sensors is limited.

SUMMARY OF THE INVENTION

In addressing the above problem, therefore, an object of the present invention is to provide an apparatus for canceling drift in an angular velocity detecting sensor so that control can be made accurately on a control system having a wide control band including a DC zone irrespective of the drift of the angular velocity detecting sensor.

In order to attain the above object, according to an aspect of the present invention, the drift canceling apparatus in which a detection output of an angular velocity detecting sensor having temperature/time drift is supplied to an object to be controlled to thereby control the object to be controlled, comprises: a reference signal extraction means for extracting a reference signal from the detection output of the angular velocity detecting sensor; and a control signal generation means for generating a control signal from the output of the angular velocity detecting sensor on the basis of the reference signal so that the control signal is used to control the object to be controlled.

Preferably, in the above drift canceling apparatus, the reference signal extraction means includes a differentiation circuit for differentiating the detection output of the angular velocity detecting sensor to generate a train of pulses, a comparison circuit for comparing the detection output of the angular velocity detecting sensor with the train of pulses of the differentiation circuit to produce a train of pulses, a pulse selection circuit for selecting only a train of pulses in a required normal operation region from the train of pulses of the comparison circuit, and a sample hold circuit for sample holding the detection output of the angular velocity detecting sensor in response to the train of pulses outputted from the pulse selection circuit to thereby produce a sample hold signal to be used as the reference signal; and the control signal generation means includes a differential amplification circuit for generating a differential signal between the detection output of the angular velocity detecting sensor and the reference signal of the sample hold circuit so that the differential signal is used as the control signal to control the object to be controlled.

In the above configuration, since the control signal to be applied to the object to be controlled is generated in accordance with the reference signal extracted from the detection output per se of the angular velocity detecting sensor, the influence due to the above-mentioned temperature/time drift can be reduced.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENTS

Now, referring to the accompanying drawings, the present invention will be described in detail about preferred embodiments.

Figure 1:
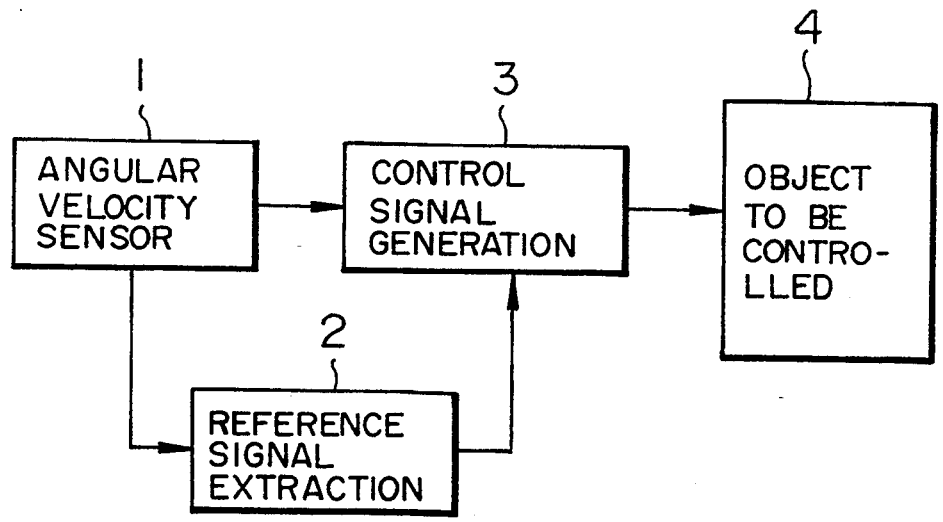
FIG. 1 is a block diagram for explanation of the configuration of an embodiment of the apparatus for canceling drift in an angular velocity detecting sensor according to the present invention.

FIG. 1 is a block diagram for explanation of the configuration of an embodiment of the apparatus for canceling drift in an angular velocity detecting sensor according to the present invention.

In FIG. 1, the drift canceling apparatus includes an angular velocity detecting sensor 1, a reference signal extraction means 2, and a control signal generation means 3. The detection output of the angular velocity detecting sensor 1 is supplied to the reference signal extraction means 2 so that the reference signal extraction means 2 extracts a reference signal from the detection output of the angular velocity detecting sensor 1.

The output, that is, the reference signal, from the reference signal extraction means 2 is supplied to the control signal generation means 3 so that the control signal generation means 3 generates a control signal on the basis of the reference signal, the control signal being used to control an object 4 to be controlled.

Figure 2:
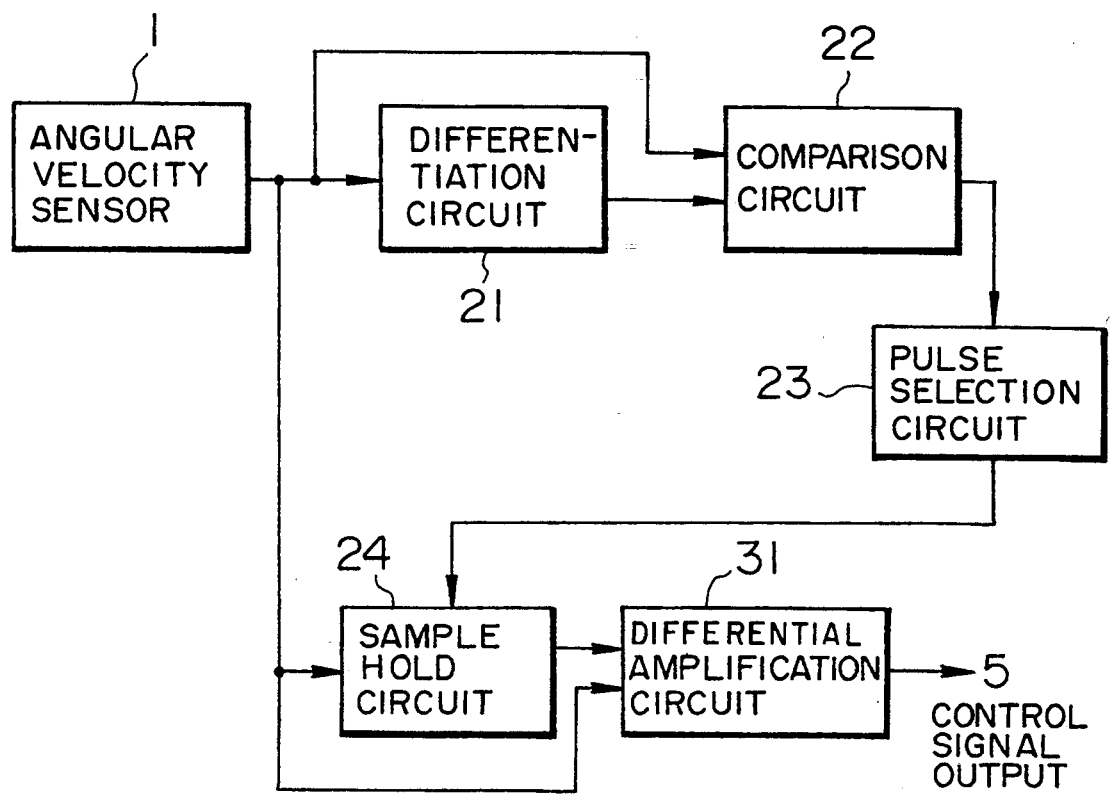
FIG. 2 is a block diagram for explanation of the configuration of another embodiment of the apparatus for canceling drift in an angular velocity detecting sensor according to the present invention.

FIG. 2 is a block diagram for explanation of the configuration of another embodiment of the present invention which is a specific example of FIG. 1.

In FIG. 2, a differentiation circuit 21, a comparison circuit 22, a pulse selection circuit 23, and a sample hold circuit 24 constitute a circuit corresponding to the reference signal extraction means 2 of FIG. 1. The detection output of the angular velocity detecting sensor 1 is supplied to the differentiation circuit 21 so that the differentiation circuit 21 differentiates the detection output of the angular velocity detecting sensor 1 to generate a train of pulses. The train of pulses of the differentiation circuit 21 are supplied to the comparison circuit 22 so that the comparison circuit 22 compares the detection output of the angular velocity detecting sensor 1 with the differential train of pulses to produce a train of pulses when the detection output of the angular velocity detecting sensor 1 coincides with the train of pulses of the differentiation circuit 21. The train of pulses of the comparison circuit 22 are supplied to the pulse selection circuit 23 so that the pulse selection circuit 23 selects the train of pulses supplied from the comparison circuit 22 so as to output only a train of pulses in a required normal operation region in which the whole circuit operates in a normal state. The pulse selection circuit 23 monitors the time intervals of the train of pulses supplied from the comparison circuit 22 or the operation state of the differentiation circuit 21 to thereby determine the pulses to output. Specifically, the pulse selection circuit 23 detects a voltage across a capacitor (not shown) constituting the differentiation circuit 21 so that the pulse selection circuit 23 supplies the sample hold circuit 24 in the succeeding stage with only output pulses which do not saturate the circuit.

The sample hold circuit 24 is supplied with the detection output of the angular velocity detecting sensor 1 and the output train of pulses of the pulse selection circuit 23 so that the sample hold circuit 24 sample-holds the detection output of the angular velocity detecting sensor 1 in response to the output train of pulses of the pulse selection circuit 23 to thereby produce a sample hold signal which is used as the reference signal.

A differential amplification circuit 31 corresponds to the control signal generation means 3 of FIG. 1. The differential amplification circuit 31 is supplied with the detection output of the angular velocity detecting sensor 1 and the reference signal, that is, the sample hold signal of the sample hold circuit 24 so that the differential amplification circuit 31 produces a differential signal corresponding to a difference between the detection output and the reference signal. The differential signal is outputted as a control signal 5 to control an object to be controlled.

Figure 3:
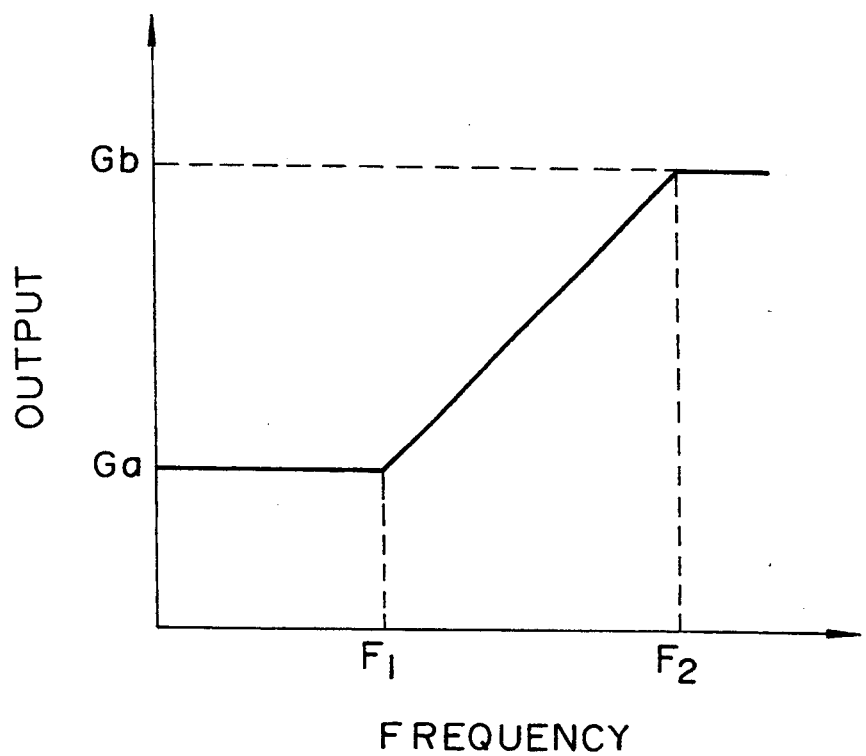
FIG. 3 is a diagram for explanation of the differentiation circuit in FIG. 2.

FIG. 3 is an explanatory diagram of the differentiation circuit 21 of FIG. 2. In FIG. 3, the axes of abscissa and ordinate represent the frequency and the differential output.

The differentiation circuit 21 is established so that in FIG. 3, the gain of the differentiation circuit 21 is $G_a$ and $G_b$ in the drift band equal to or lower than the frequency $F_1$ and in the control system response band equal to or higher than the frequency $F_2$, respectively.

Figure 4:
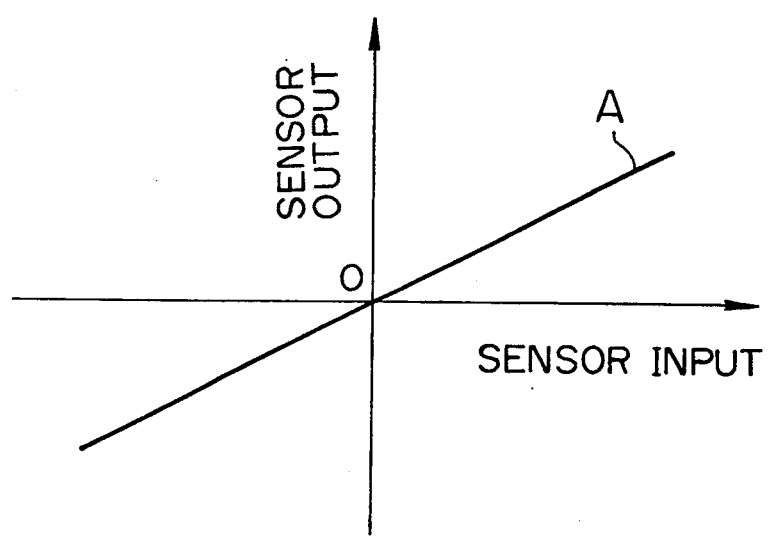
FIG. 4 is a diagram for explanation of the output characteristic of the angular velocity detecting sensor.

FIG. 4 is a diagram for explanation of the output characteristic of the angular velocity detecting sensor. In FIG. 4, the axes of abscissa and ordinate represent the angular velocity input to the sensor and the sensor output, respectively.

Assuming the angular velocity detecting sensor has such an ideal characteristic that both the offset and drift are zero, the output characteristic of the angular velocity detecting sensor shows that its output becomes zero when its angular velocity input is zero as shown by the line A in FIG. 4.

Figure 5:
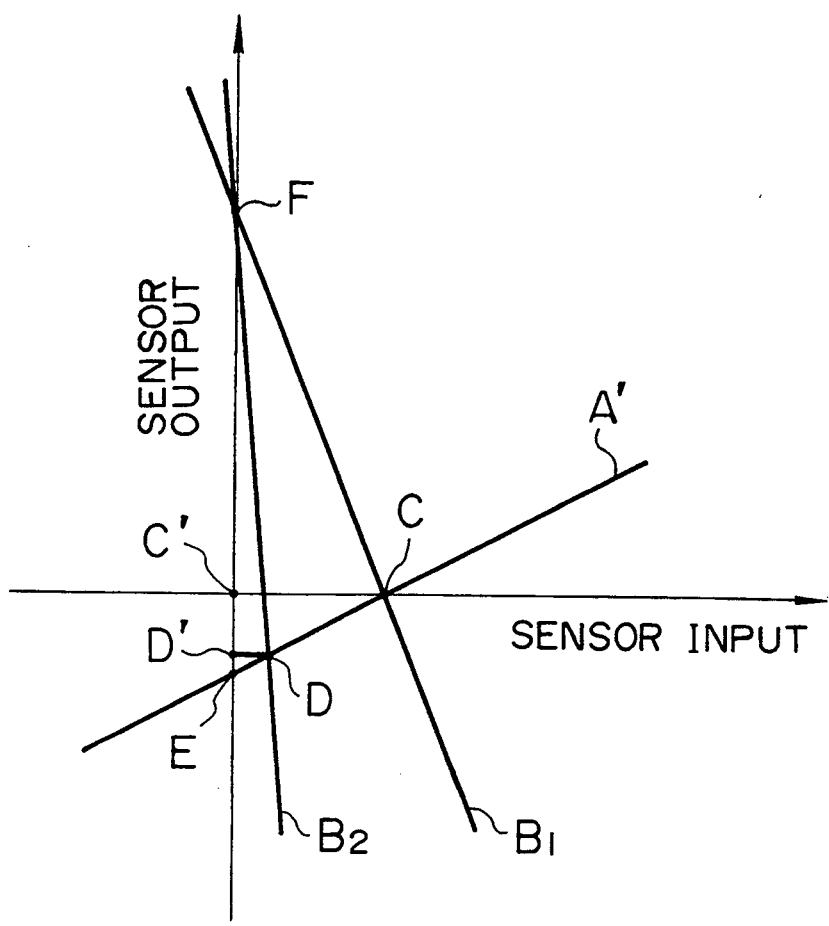
FIG. 5 is a diagram for explanation of the operation characteristic of an embodiment of the present invention.

FIG. 5 is a diagram for explanation of the operation characteristic of this embodiment. In FIG. 5, the axes of abscissa and ordinate represent the angular velocity input to the sensor and the sensor output, respectively.

In the actual case of the angular velocity detecting sensor having drift, on the contrary to the case of the ideal angular velocity detecting sensor of FIG. 4, the characteristic of the angular velocity detecting sensor is such that the output of the sensor has a certain value E even when the input angular velocity is zero as shown by the line A' in FIG. 5.

Further, the output characteristic of the differentiation circuit is as shown by the lines $B_1$ and $B_2$ in the frequency bands not higher than $F_1$ and not lower than $F_2$ respectively in FIG. 3. This is because the output of the differentiation circuit 21 when the sensor input is zero and after a lapse of time corresponding to the frequency band not higher than $F_1$ is a value F which is obtained by multiplying the value E by the gain $G_a$ (the value of $G_a$ is negative here), and in the frequency band not higher than $F_1$, the line $B_1$ passes through the point F and intersects the line A' at the point C where the sensor output is zero as shown in FIG. 5.

In the frequency band not lower than $F_2$, on the other hand, the characteristic is as shown by the line $B_2$. That is, the line $B_2$ has a gradient of $G_b/G_a$ relative to the line $B_1$ having a gradient which intersects the axis of sensor output at the point F.

Accordingly, a hold pulse to be supplied to the sample hold circuit 24 is outputted at the point C which is the intersection of the lines A' and $B_1$ in the operation frequency band not higher than the frequency $F_1$, while the hold pulse is outputted at the point D which is the intersection of the lines A' and $B_2$ in the operation frequency band not lower than the frequency $F_2$, so that the sensor output values C' and D' corresponding to the points C and D are held respectively.

Although the difference between the sensor output values at the respective points C' and E is nothing but the value of drift, the difference between the sensor output values at the respective points D' and E is a value reduced to be $G_b/G_a$ times as large as the drift value. If only the hold pulse generated in the region not lower than the frequency $F_2$ is selectively used in order to use only the value at the point D' as a reference signal (reference voltage), a sensor output having no drift can be obtained as a result.

Figure 6:
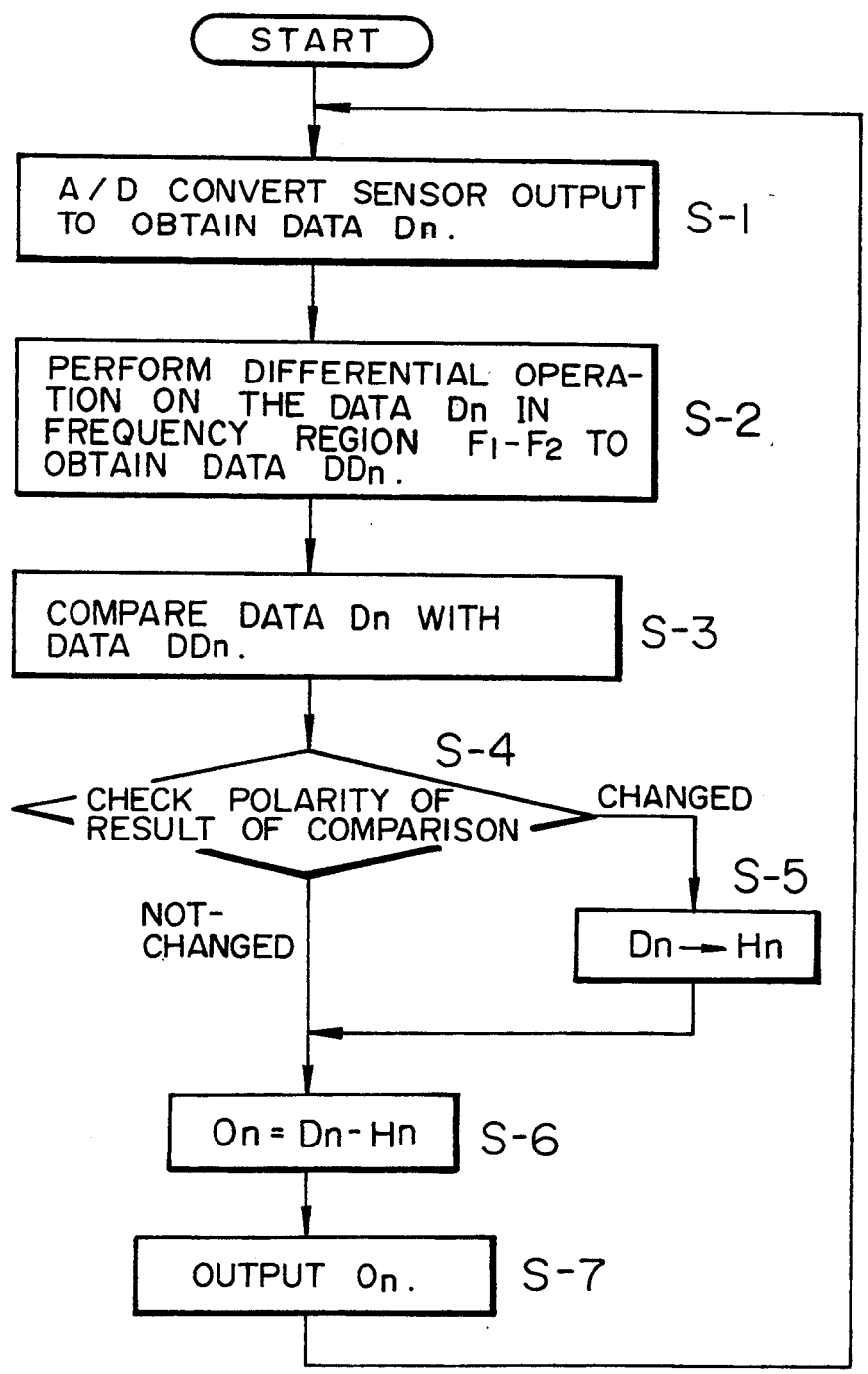
FIG. 6 is a flowchart for explanation of the algorithm in an embodiment in which the angular velocity detecting sensor drift cancellation system according to the present invention is applied to a controller using a microcomputer.

FIG. 6 is a flowchart for explanation of the algorithm in an embodiment in which the angular velocity detecting sensor drift cancellation apparatus according to the present invention is applied to a controller using a microcomputer.

In FIG. 6, first, the detection output or sensor output of the angular velocity detecting sensor 1 is A/D converted to obtain digital data Dn in a step S-1. Then, differential operation is carried out on data Dn in the frequency region $F_1$—$F_2$ to obtain data DDn in a step S-2. Then, data Dn is compared with data DDn in a step S-3. Then, judgment is made as to whether the polarity of the difference value obtained in the step S-3 has changed or not in a step S-4. If it is proved that the difference value has changed in the step S-4, the value of data Dn is read as the hold value Hn in a step S-5 and then the step goes to a next step S-6. Here, the hold value "Hn" corresponds to the value D' held at the point D in FIG. 5. If it is proved that the difference value did not change in the step S-4, the value of data Dn is used as it is and the step goes to the step S-6. The held value Hn is subtracted from the data Dn to obtain a control output On (Dn—Hn=On) in the step S-6, and the control output On is supplied in the step S-7 to the object to be controlled.

Thus, it is possible that the detection output of the angular velocity detecting sensor is subjected to signal processing by the microcomputer to control the object to be controlled.

Figure 7:
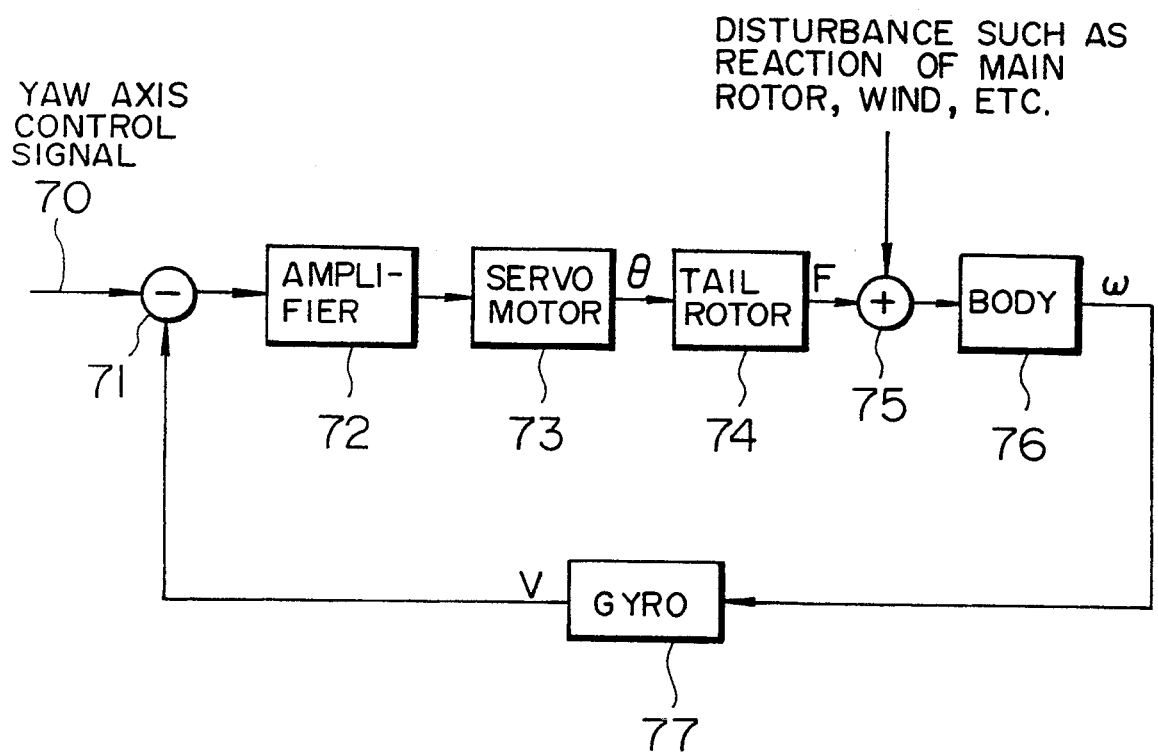
FIG. 7 is a block diagram for explanation of the configuration of a control circuit in the case where the present invention is applied to the yaw axis control of a model helicopter.

FIG. 7 is a block diagram for explanation of the configuration of a control circuit in the case where the present invention is applied to the yaw axis control of a model helicopter.

In FIG. 7, a yaw axis control signal 70, which corresponds to the control signal output 5 in the above embodiment according to the present invention, is subjected to subtraction by a subtracter 71 to obtain a difference signal between the yaw axis control signal 70 and an output V of a gyro 77 and the difference signal is amplified to a predetermined level by an amplifier 72. The output of the amplifier 72 is supplied to a servo motor 73 which supplies a tail rotor 74 with a control output for controlling a pitch angle θ of the tail rotor 74. The yaw axis of a body 76 is changed on the basis on the output force F of the tail rotor 74 and taking account of disturbance such as reaction of a main rotor, wind and the like (typically expressed by an adder 75 in the drawing). The change ω of the yaw axis is detected by the gyro 77 and the detection output V of the gyro 77 is fed back to the subtracter 71.

By carrying out the above sequence by using the drift-canceled angular velocity detecting sensor according to the present invention, it is possible to perform the attitude control of a model helicopter easily and accurately.

The present invention is not limited to such a yaw axis control of a model helicopter, but it is a matter of course that the present invention is applicable to the attitude control of a navigation system, a robot and the like using a gyro, or the attitude control of any other apparatus.

As has been described above, according to the present invention, even in a case where a control system in which also a DC zone is included as an object to be controlled is constituted by using an angular velocity detecting sensor with drift, the influence of the drift on the control system can be reduced so that the range of application of the angular velocity detecting sensor can be widened and the control performance of the control system can be largely improved to thereby make it possible to provide a control system with high accuracy.

What is claimed is:

1. A drift canceling apparatus in which a detection output of an angular velocity detecting sensor having temperature/time drift is supplied to an object to be controlled to thereby control said object to be controlled, said apparatus comprising:

a reference signal extraction means for extracting a reference signal from the detection output of said angular velocity detecting sensor; said reference signal extraction means includes a differentiation circuit for differentiating the detection output of said angular velocity detecting sensor to generate an output signal, a comparison circuit for comparing the detection output of said angular velocity detecting sensor with said output signal of said differentiation circuit to produce a comparison circuit output signal, a selection circuit for selecting only an output in a required normal operation region from said comparison circuit output signal, and a sample hold circuit for sample-holding the detection output of said angular velocity detecting sensor in response to the output of said selection circuit to produce a sample hold signal to be used as said reference signal; and a control signal generation means for generating a control signal from the output of said angular velocity detecting sensor on the basis of said reference signal so that said control signal is used to control said object to be controlled.

2. A drift canceling apparatus in which a detection output of an angular velocity detecting sensor having temperature/time drift is supplied to an object to be controlled to thereby control said object to be controlled, said apparatus comprising:

a reference signal extraction means for extracting a reference signal from the detection output of said angular velocity detecting sensor; and a control signal generation means for generating a control signal from the output of said angular velocity detecting sensor on the basis of said reference signal so that said control signal is used to control said object to be controlled;

said reference signal extraction means including:

a differentiation circuit for differentiating the detection output of said angular velocity detecting sensor to generate a train of pulses;

a comparison circuit for comparing the detection output of said angular velocity detecting sensor with the train of pulses of said differentiation circuit to produce a train of pulses;

a pulse selection circuit for selecting only a train of pulses in a required normal operation region from the train of pulses of said comparison circuit; and a sample hold circuit for sample-holding the detection output of said angular velocity detecting sensor in response to the train of pulses outputted from said pulse selection circuit to thereby produce a sample hold signal to be used as said reference signal; and in which said control signal generation means includes a differential amplification circuit for generating a differential signal between said detection output of said angular velocity detecting sensor and said reference signal of said sample hold circuit so that said differential signal is uses as said control signal to control said object to be controlled.

3. A drift canceling apparatus in which an output of a sensor having drift is supplied to an object to be controlled, comprising:

a reference signal extraction means for extracting a reference signal from the detection output of said sensor to generate an output signal; said reference signal extraction means including:

a differentiation circuit receiving the output of said sensor;

a comparison circuit receiving the output of said sensor and the output of said differentiation circuit for comparing the output of said sensor with said output signal of said differentiation circuit to produce a comparison circuit output signal;

a sample hold circuit receiving the output of said sensor, for selectively holding the output of said sensor to produce a sample hold signal to be used as said reference signal; and a control signal generation means receiving the output of said sensor and said reference signal, for generating a control signal.

* * * * *